United States Patent [19]
Duesler et al.

[11] Patent Number: 5,778,659
[45] Date of Patent: Jul. 14, 1998

[54] VARIABLE AREA FAN EXHAUST NOZZLE HAVING MECHANICALLY SEPARATE SLEEVE AND THRUST REVERSER ACTUATION SYSTEMS

[75] Inventors: Paul W. Duesler, Manchester; Constantino V. Loffredo, Newington, both of Conn.; Harold T. Prosser, Jr., Palm Beach Gardens, Fla.; Christopher W. Jones, Reston, Va.

[73] Assignee: United Technologies Corporation, Hartford, Conn.

[21] Appl. No.: 823,294

[22] Filed: Mar. 21, 1997

Related U.S. Application Data

[63] Continuation-in-part of Ser. No. 572,839, Dec. 14, 1995, abandoned, which is a continuation-in-part of Ser. No. 326,621, Oct. 20, 1994, abandoned.

[51] Int. Cl.⁶ .................. F02C 3/02; F02K 1/09; F02K 1/70
[52] U.S. Cl. .................. 60/226.1; 60/226.2; 60/230; 244/110 B; 239/265.31; 239/265.27
[58] Field of Search ............... 60/226.2, 226.1, 60/230, 271; 244/110 B; 239/265.19, 265.23, 265.27, 265.29, 265.31

[56] References Cited

U.S. PATENT DOCUMENTS

| | | | |
|---|---|---|---|
| 3,262,271 | 7/1966 | Beavers | 60/226.2 |
| 3,662,556 | 5/1972 | Poucher et al. | 60/226.1 |
| 3,665,709 | 5/1972 | Medawar et al. | 60/226.2 |
| 3,747,855 | 7/1973 | Vdoviak et al. | 239/265.29 |
| 3,779,010 | 12/1973 | Chamay et al. | 60/226.2 |
| 3,797,785 | 3/1974 | Baerresen et al. | 244/53 R |
| 3,820,719 | 6/1974 | Clark | 60/226.2 |
| 3,829,020 | 8/1974 | Stearns | 239/265.29 |
| 3,841,091 | 10/1974 | Sargisson et al. | 60/230 |
| 3,981,450 | 9/1976 | McCardle, Jr. et al. | 244/110 B |
| 4,005,822 | 2/1977 | Timms | 60/226.2 |
| 4,145,877 | 3/1979 | Montgomery | 60/226.2 |
| 4,501,393 | 2/1985 | Klees et al. | 60/262 |
| 4,732,535 | 3/1988 | Tubbs | 60/226.2 |
| 4,802,629 | 2/1989 | Klees | 239/265.19 |
| 4,807,434 | 2/1989 | Jurich | 60/226.2 |
| 4,922,713 | 5/1990 | Barbarin et al. | 60/226.2 |
| 5,090,196 | 2/1992 | Balzer | 60/226.2 |
| 5,181,676 | 1/1993 | Lair | 244/110 B |
| 5,228,641 | 7/1993 | Remlaoui | 60/226.2 |
| 5,313,788 | 5/1994 | Wright et al. | 60/226.2 |

FOREIGN PATENT DOCUMENTS

| | | | |
|---|---|---|---|
| 0109219 | 5/1984 | European Pat. Off. | 60/226.2 |
| 0315524 | 5/1989 | European Pat. Off. | 60/226.2 |
| 1421153 | 1/1976 | United Kingdom | 60/226.2 |

Primary Examiner—Timothy Thorpe
Assistant Examiner—Ted Kim
Attorney, Agent, or Firm—Kenneth C. Baran

[57] ABSTRACT

A gas turbine engine (10) includes a translating sleeve (38) disposed within a downstream portion of an outer nacelle (20). A variable area fan exhaust nozzle (30) is defined between the trailing edge (32) of the translating sleeve (38) and a conical core cowl (26) disposed radially inwardly of the outer nacelle (20) and spaced apart therefrom. The translating sleeve (38) translates downstream to cooperate with the decreasing diameter of the core cowl (26) to increase the area of the fan exhaust nozzle (30).

7 Claims, 6 Drawing Sheets

VARIABLE AREA FAN EXHAUST NOZZLE HAVING MECHANICALLY SEPARATE SLEEVE AND THRUST REVERSER ACTUATION SYSTEMS

This is a continuation in part of U.S. application Ser. No. 08/572,839, filed Dec. 14, 1995, which in turn is a continuation in part of U.S. application Ser. No. 08/326,621, filed Oct. 20, 1994, now abandoned.

TECHNICAL FIELD

The present invention relates to a gas turbine engine and, more particularly, to a variable area fan exhaust nozzle therefor.

BACKGROUND OF THE INVENTION

Important performance criteria for modern aircraft gas turbine engines include greater thrust, minimization of weight, and reduction in noise levels and fuel consumption. As is well known in the art, a reduction in the fan pressure ratio improves the propulsive efficiency of a gas turbine engine. As the fan pressure ratio is reduced, the mass flow rate through the fan must be increased to maintain the same engine thrust. Longer fan blades increase the mass flow rate. However, reduction of the fan pressure ratio and an increase in the length of the fan blades adversely affect the fan stability. Longer fan blades rotating at lower speeds pump additional air through the fan. At cruise, the additional mass flow at the lower fan pressure ratio contributes to the engine thrust as the air exists through a fan exhaust nozzle disposed downstream of the fan. However, at takeoff, climb, and descent, the additional air is restricted through the fan exhaust nozzle and the resulting back pressure on the fan negatively affects the aerodynamic stability of the fan. Thus, fan stability is a limiting factor to low fan pressure ratio engines.

Varying the pitch of the fan blades is one approach to control fan stability. The pitch of the fan blades changes to tailor the amount of airflow passing through the fan during the different modes of operation of the gas turbine engine. During takeoff, climb and descent, the amount of air pumped by the fan blades is reduced, thereby reducing back pressure and avoiding instability conditions.

Another approach to improve performance of the gas turbine engine is described in U.S. Pat. No. 5,181,676 to Lair, entitled "Thrust Reverser Integrating A Variable Exhaust Area Nozzle". The patent discloses two clam shells that rotate about a pivot upon actuation to increase the exhaust area of the nozzle. A limitation of the disclosed fan nozzle is that only a small increase in the nozzle area is possible without adversely affecting external or internal aerodynamics. Moreover, the nozzle can suffer undesirable leakage of airflow, thereby reducing the performance of the gas turbine engine. Additionally, since the fan exhaust nozzle functions as a pressure vessel, it is subjected to significant internal pressure that tends to deform each clam shell, since they are supported only at discrete points. The clam shell, as disclosed in the above-mentioned patent, must carry a significant weight penalty to control such deformation of the fan exhaust nozzle.

U.S. Pat. No. 4,922,713 to Barbarin et al shows a thrust reverser with a variable exhaust cross section. The patent discloses a translating cowl moving downstream to open an auxiliary passageway, thereby increasing the area available for discharging gases from the exhaust nozzle. However, the disclosed invention is not suitable for low pressure ratio fans, because the actuation system of the disclosed configuration is limited to a sequence of operations which, for low pressure ratio fan designs, will cause instability of the fan during transition to reverse thrust. The configuration dictates that the translating cowl must be stowed prior to activation of the thrust reverser. For low pressure ratio fans, the reduction in the fan nozzle area will be detrimental to stability and will result in stalling of the fan.

Furthermore, the described configuration has significant aerodynamic and acoustic limitations. The disclosed configuration has an adverse impact on an aerodynamic efficiency of both the overall aircraft and the propulsion system. The adverse effect to the aircraft is two-fold. At high speed operations, the radial velocity component due to the auxiliary nozzle flow is a potential safety hazard because of its detrimental effect on flow as it approaches the wing. At low speed operations, the radial velocity component disturbs airflow around the wing degrading lift at low speeds and thereby degrading the performance of the aircraft.

The auxiliary airflow path of the disclosed configuration adversely affects the propulsion system by introducing three aerodynamic performance loss mechanisms: shock losses produced by supersonic turning; increasing pressure drag; and increased friction losses.

Moreover, the disclosed configuration negatively impacts internal aerodynamic performance by incorporating struts that span the auxiliary airflow path. The struts reduce the aerodynamic performance of the internal flow path and also increases the scrubbing drag and pressure drag of the internal flow.

Additionally, the disclosed configuration significantly degrades acoustic performance of the aircraft because the auxiliary nozzle introduces multiple noise sources.

Another major shortcoming of the U.S. Pat. No. 4,922,713 is that the second moveable cowl, once translated to the maximum area position, must be retracted prior to entering the reverse thrust mode so that the second moveable cowl can be locked to the first moveable cowl. Thus, any malfunction which prevents retraction of the second moveable cowl will prevent deployment of the thrust reverser.

There is still a great need to provide a high performance gas turbine engine having minimized weight, lower noise, and lower fuel consumption levels without jeopardizing other performance characteristics thereof.

DISCLOSURE OF THE INVENTION

According to the present invention, a gas turbine engine having a core engine enclosed in a conical core cowl and an aerodynamically contoured outer nacelle with the outer nacelle being disposed radially outwardly of the core cowl and spaced apart therefrom and defining a duct therebetween, includes a translating sleeve disposed in the downstream portion of the outer nacelle to increase the effective throat area of the fan exhaust nozzle as the translating sleeve translates axially downstream and cooperates with a decreasing downstream diameter of the conical core cowl. The fan exhaust nozzle throat is defined between the trailing edge of the translating sleeve and the core cowl. The translating sleeve comprises an aerodynamically-shaped body and a plurality of actuating means moving the translating sleeve from a fully stowed position axially downstream into a fully deployed position during climb, takeoff, and descent. The translating sleeve is also capable of having a plurality of intermediate deployed positions.

The variable area fan exhaust nozzle allows gas turbine engines to have higher efficiency at cruise without adversely effecting fan stability at other modes of operation. With the translating sleeve in the fully stowed position at cruise, propulsive efficiency is high as the air exits through the fan exhaust nozzle. At takeoff, climb, and descent, the translating sleeve is translated axially downstream into the deployed position so that the effective throat area of the fan exhaust nozzle, defined between the trailing edge of the axially extended translating sleeve and reduced diameter core cowl, is increased. Therefore, at takeoff, climb, and descent, the additional airflow, generated by the fan blades having a lower pressure ratio and a greater mass flow, exits through the increased area of the fan exhaust nozzle without causing sufficient back pressure to stall the fan. Additionally, the present invention improves the fuel consumption at cruise and reduces noise levels at takeoff, climb, and approach. Moreover, the plurality of intermediate deployed positions of the translating sleeve results in a gradual and continuous variation of area of the fan exhaust nozzle, allowing further optimization of performance of the gas turbine engine by improving weight of the overall engine and fuel consumption.

One feature of the present invention is that the translating sleeve comprises two semi-cylinders mating with each other to provide a continuous inner surface of the nozzle to withstand internal pressure and to minimize the leakage of airflow. Another feature of the present invention is that a generally convergent cross-sectional area of the duct is maintained during all positions of the translating sleeve so that the minimum cross-sectional area of the duct occurs at a throat defined by the trailing edge of the translating sleeve and the core cowl. A further feature of the present invention is that as the translating sleeve moves downstream, the throat area is monotonically increasing as a function of the length of the translation of the translating sleeve.

A major advantage of the present invention is that the translating sleeve is relatively simple structurally and is able to withstand "hoop" loading with relatively light weight structure. Another advantage of the present invention is that it overcomes aerodynamic, acoustic, and safety deficiencies of the prior art.

The foregoing and other objects and advantages of the present invention will become more apparent in light of the following detailed description of the exemplary embodiments thereof, as illustrated in the accompanying drawings.

BEST MODE FOR CARRYING OUT THE INVENTION

Figure 1:
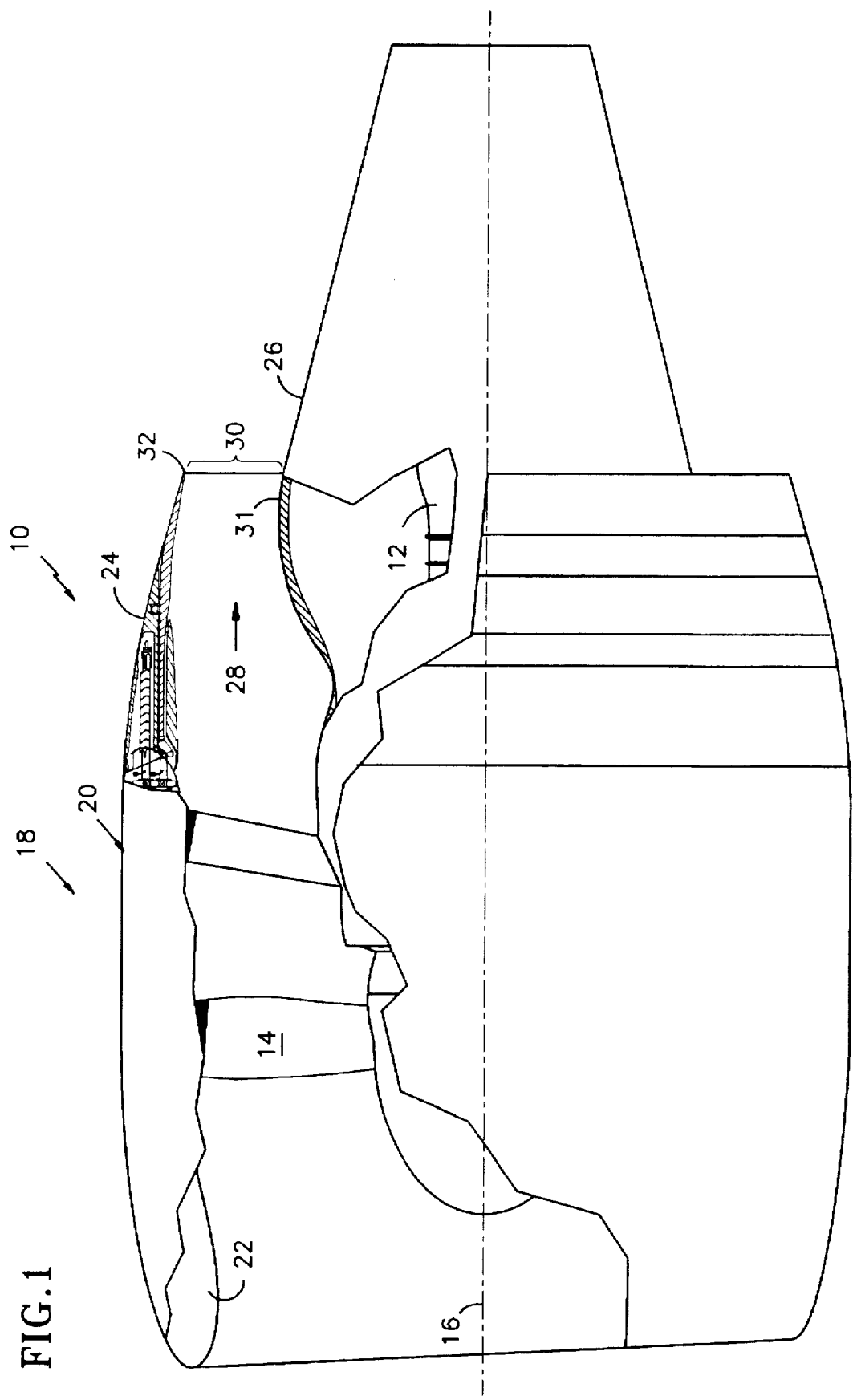
FIG. 1 is a simplified, cross-sectioned elevation of a gas turbine engine and a nacelle with a thrust reverser and a translating sleeve, according to the present invention.

Referring to FIG. 1, a gas turbine engine 10 having a core engine 12 with a fan 14 disposed about a center longitudinal axis 16 includes an annular nacelle 18 encasing the core engine 12. The annular nacelle 18 comprises an aerodynamically streamlined outer nacelle 20 having an upstream portion 22 and a downstream portion 24 and a conical, aftwardly convergent, fixed geometry core cowl 26 disposed radially inwardly from the outer nacelle 20 and spaced apart therefrom. The outer nacelle 20 cooperates with the core cowl 26 to define a longitudinally extending annular flow path or exhaust duct 28 therebetween. The discharge plane of the exhaust duct is a throat 30 defined between a trailing edge 32 of the outer nacelle 20 and the core cowl 26. The throat is the exclusive outlet for discharging a quantity of working medium gases from the duct for producing forward thrust.

Figure 2:
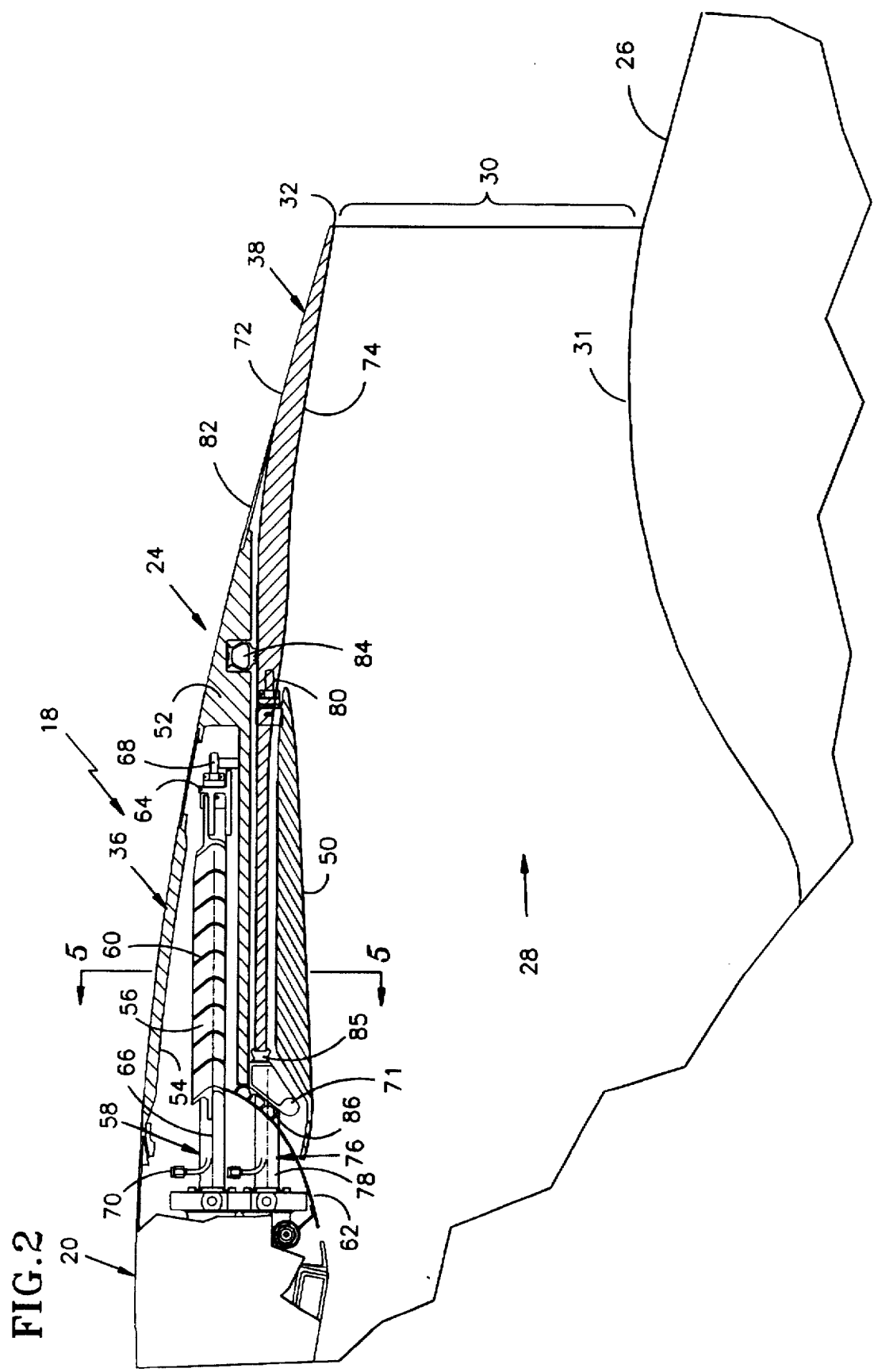
FIG. 2 is an enlarged, sectioned elevation of the thrust reverser and the translating sleeve of FIG. 1 at cruise with the thrust reverser and translating sleeve being depicted in a stowed position.
Figure 3:
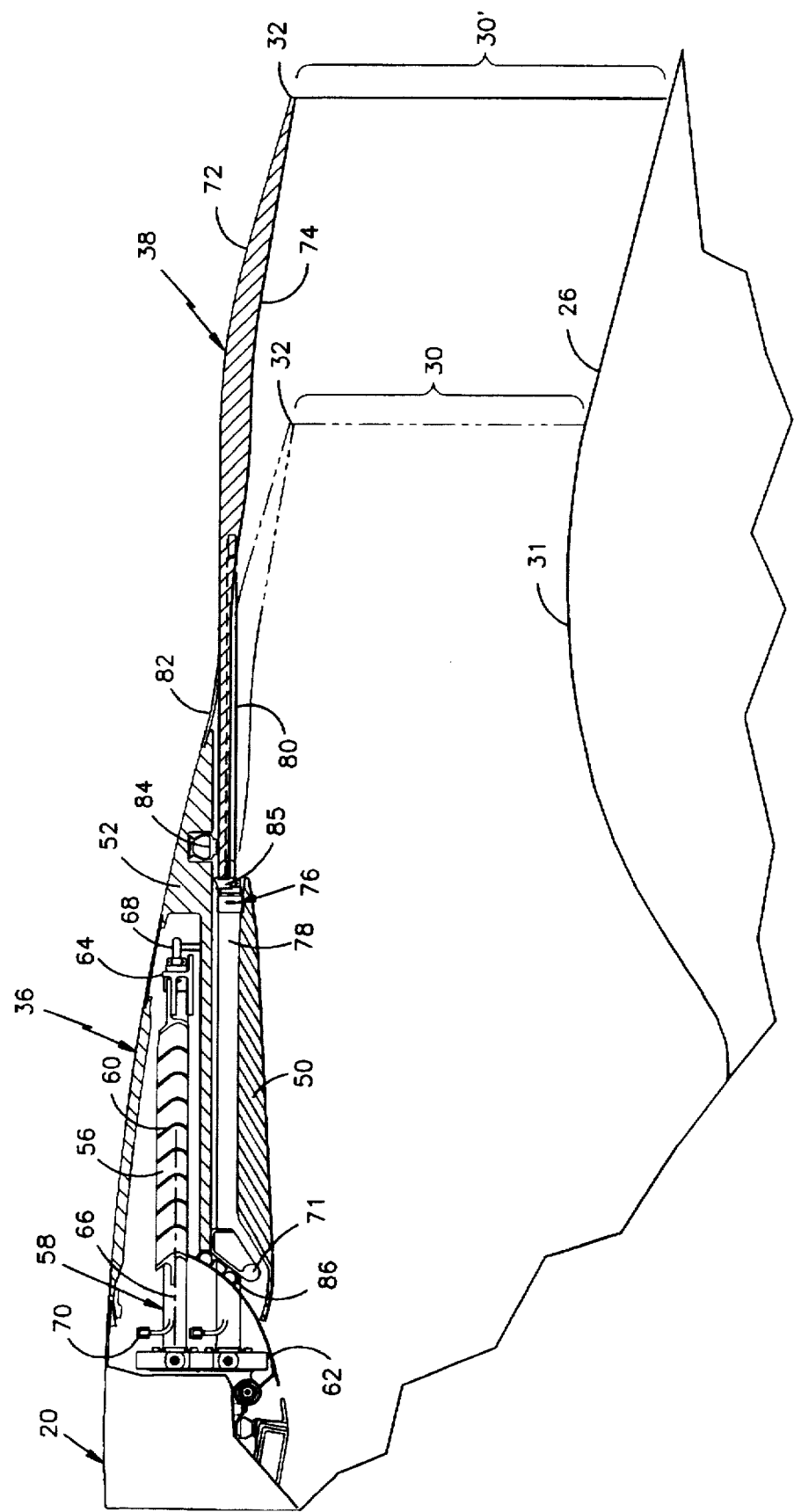
FIG. 3 is a sectioned elevation of the thrust reverser and the translating sleeve of FIG. 2, at takeoff, climb, and descent with the translating sleeve being depicted in deployed position.
Figure 4:
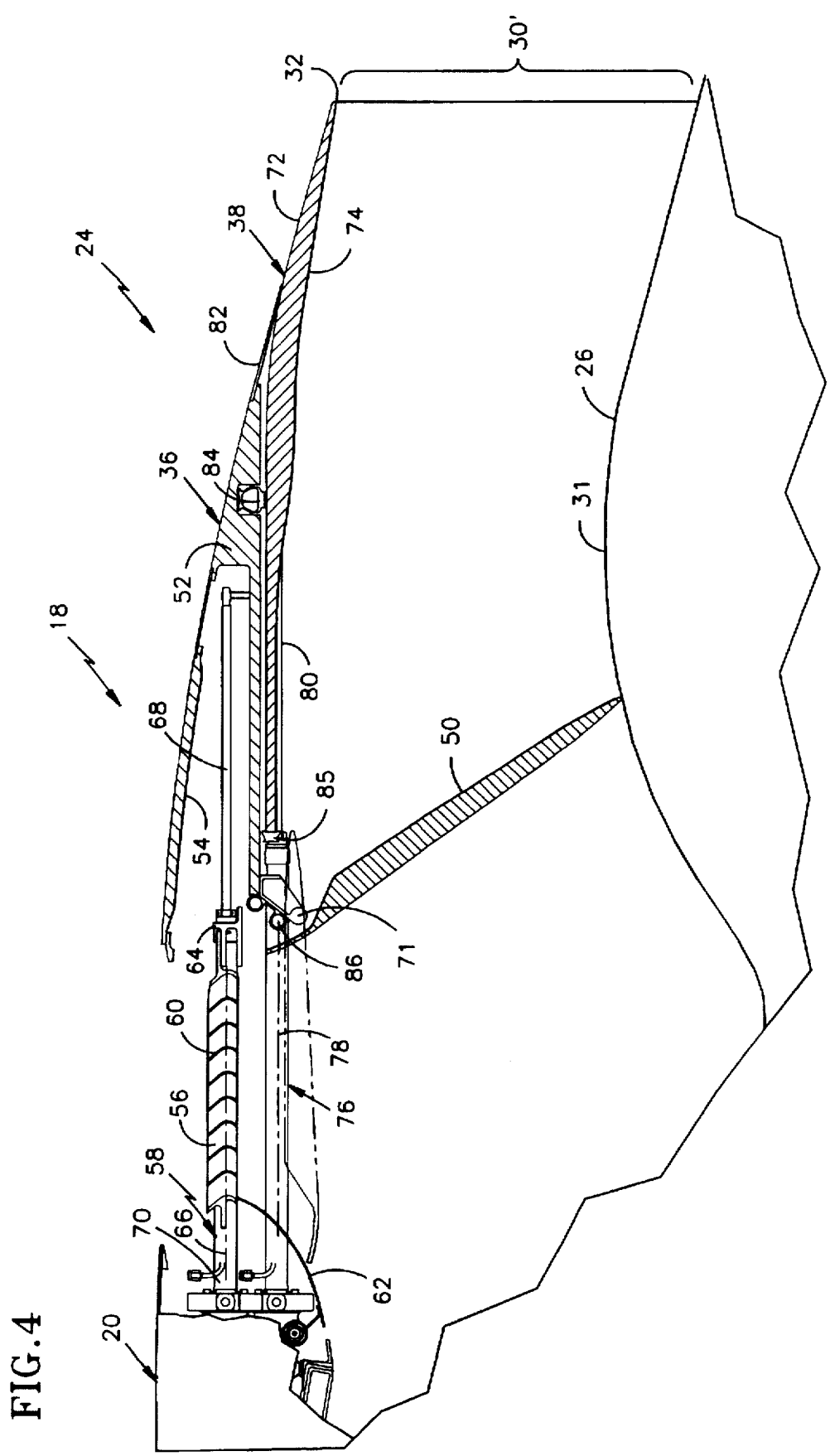
FIG. 4 is a sectioned elevation of the thrust reverser and the translating sleeve of FIG. 3 at reverse with both the thrust reverser and the translating sleeve being depicted in deployed position.

Referring to FIGS. 2–4, the downstream portion 24 of the outer nacelle 20 includes a thrust reverser mechanism 36 positionable at an engaged position (FIG. 4) and at a disengaged position (FIGS. 2 and 3) and a fixed geometry fan exhaust nozzle translating sleeve 38. The thrust reverser mechanism 36 is of a conventional type, having a plurality of thrust reverser blocker doors 50 and a thrust reverser movable body 52 with a recess 54 to accommodate a plurality of turning vanes 56 and a plurality of thrust reverser actuators 58 therein. The turning vanes 56, that include a plurality of guide vanes 60, are secured onto a torque box 62 on the upstream end thereof and a support ring 64 on the downstream end thereof. A thrust reverser actuation system includes thrust reverser actuators 58 which are hydraulic actuators of the conventional type, having a cylinder 66 and a moveable rod 68, wherein the cylinder is secured onto the torque box 62 and the rod 68 is secured onto an inner surface of the recess 54. Hydraulic pressure to the actuators is provided through tubing 70. The thrust reverser blocker door 50 is disposed radially inwardly of the thrust reverser body 52 and is in a substantially parallel relationship to the longitudinal axis 16 when in the disengaged position, as shown in FIGS. 1 through 3. The thrust reverser blocker door 50 pivots about a pivot point 71 into an engaged position, as shown in FIG. 4 so that at least a portion of the working medium gases flowing through duct 28 are diverted through the turning vanes to produce reverse thrust.

The fan exhaust nozzle translating sleeve 38, having an aerodynamically shaped outer surface 72 and inner surface 74, is disposed radially inwardly of the thrust reverser 36 and radially outwardly of the blocker door 50. The sleeve is translatable between and deployable at a stowed position (FIG. 2), a deployed position (FIG. 3) and a plurality of intermediate positions, and translatory movement of the sleeve is the exclusive means for varying the throat area and the quantity of forward thrust produces gases discharged from the duct. Aftward movement of the sleeve causes a nondiscontinuous increase in the throat area while forward movement causes a nondiscontinuous decrease in the throat area. The sleeve extends downstream of the thrust reverser 36 and, when in its stowed position, is nested radially intermediate the movable body and the blocker doors. A sleeve actuation system includes a plurality of translating sleeve actuators 76 to provide axial translation to the translating sleeve 38. Each actuator 76 is of a hydraulic type, having a cylinder 78 and a moveable rod 80, with the cylinder 78 being secured onto the torque box 62 and the rod 80 being secured onto the translating sleeve 38. An aerodynamic flap seal 82 is fixedly attached to the most downstream portion of the thrust reverser 36 to bridge the gap between the thrust reverser 36 and the translating sleeve 38 to ensure an aerodynamically smooth exterior surface of the outer nacelle 20. An inflatable seal 84 is disposed between the translating sleeve 38 and the thrust reverser 36 to reduce air leakage, therebetween during translation. Alternatively, a lip seal or any other type of a seal may be used to prevent air leakage. A translating sleeve bumper seal 85 is disposed on a leading edge of the translating sleeve 38 and bears against the pivot point 71, when the translating sleeve 38 is in a fully stowed position. A thrust reverser bumper seal 86 is disposed on the leading edge of the inner wall of the thrust reverser body 52 and bears against the torque box 62 when the thrust reverser 36 is in the fully stowed position to reduce air leakage.

Figure 5:
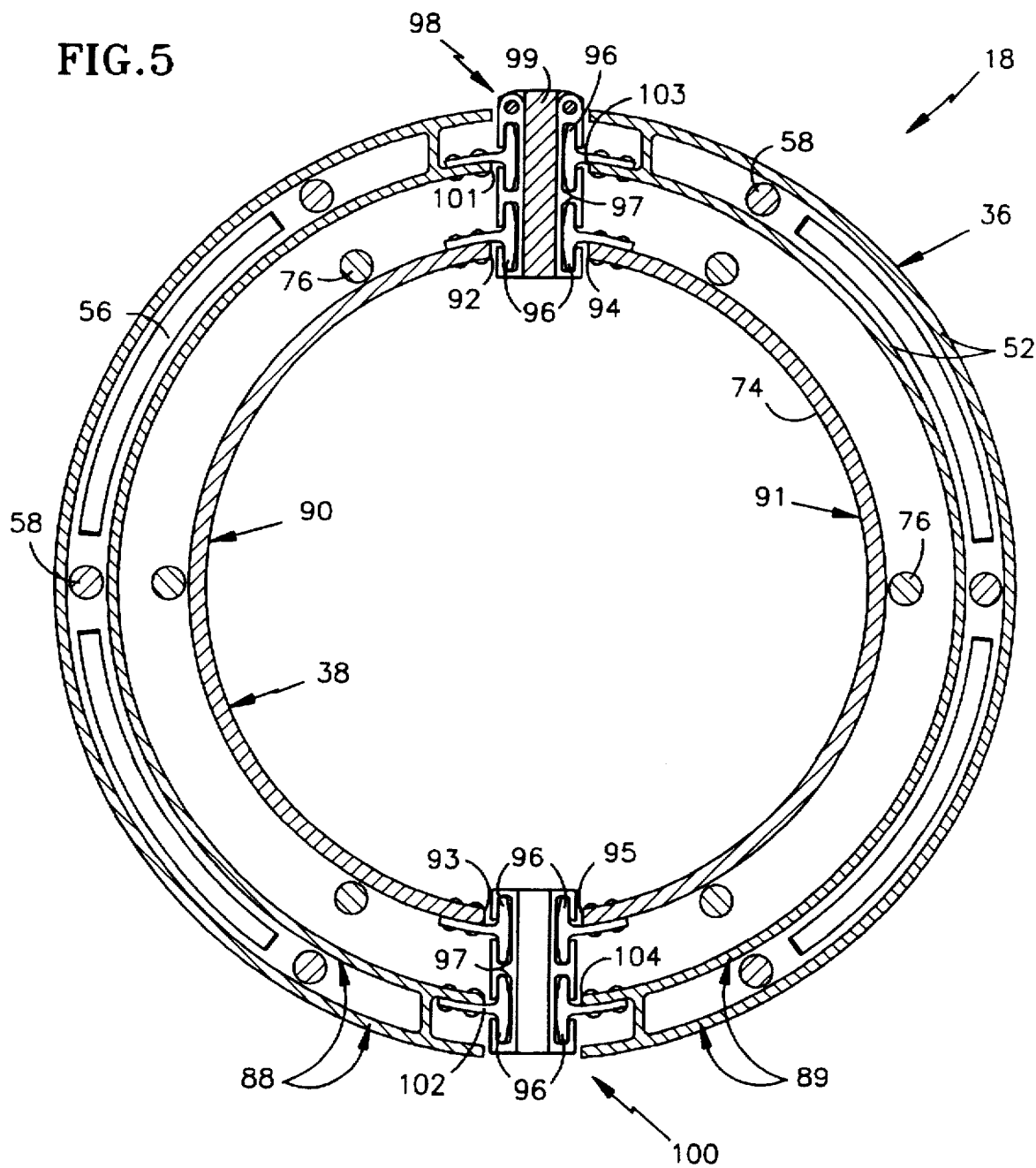
FIG. 5 is a diagrammatic, cross-sectioned elevation of the thrust reverser and the translating sleeve of FIG. 4, taken along line 5—5.

Referring to FIG. 5, the thrust reverser body 52 and the translating sleeve 38 each comprise two semi-cylinders 88, 89 and 90, 91, respectively. Each semi-cylinder 90, 91 of the translating sleeve 38 includes longitudinal edges 92–93, 94–95, respectively. Each longitudinal edge 92–95 has a T-slider 96 attached thereto. The T-sliders 96 of the longitudinal edges 92, 94 slidingly engage tracks 97 of a hinge 99 securing the hinge mechanism 98 onto a pylon (not shown), which is attached to the wing of the airplane (not shown). The T-sliders 96 of the longitudinal edges 92–95 of the translating sleeve 38 slidingly engage tracks 97 of a latch mechanism 100, which is disposed substantially diametrically from the hinge mechanism 98. The semi-cylinders 90, 91 of the translating sleeve 38 and the latch and hinge mechanisms 100, 98 form a substantially continuous annulus with the substantially continuous surface 74. The thrust reverser 36 has a mounting structure analogous to that of the translating sleeve 38. T-sliders 96 of longitudinal edges 101–104 of the semi-cylinders 88,89 of the thrust reverser body 52 slidingly engage the tracks 97 of the hinge and latch mechanisms 98,100. The latch mechanism 100 can be opened to allow the two sets of semi-cylinders 88–89, 90–91 of the thrust reverser 36 and of the translating sleeve 38 to pivot about the hinge mechanism 98 to allow access to the core engine 12 disposed therein. O-ring seals (not shown) are disposed at the ends of the tracks 97 to prevent air leakage between the tracks 97 and the T-sliders 96.

Figure 6:
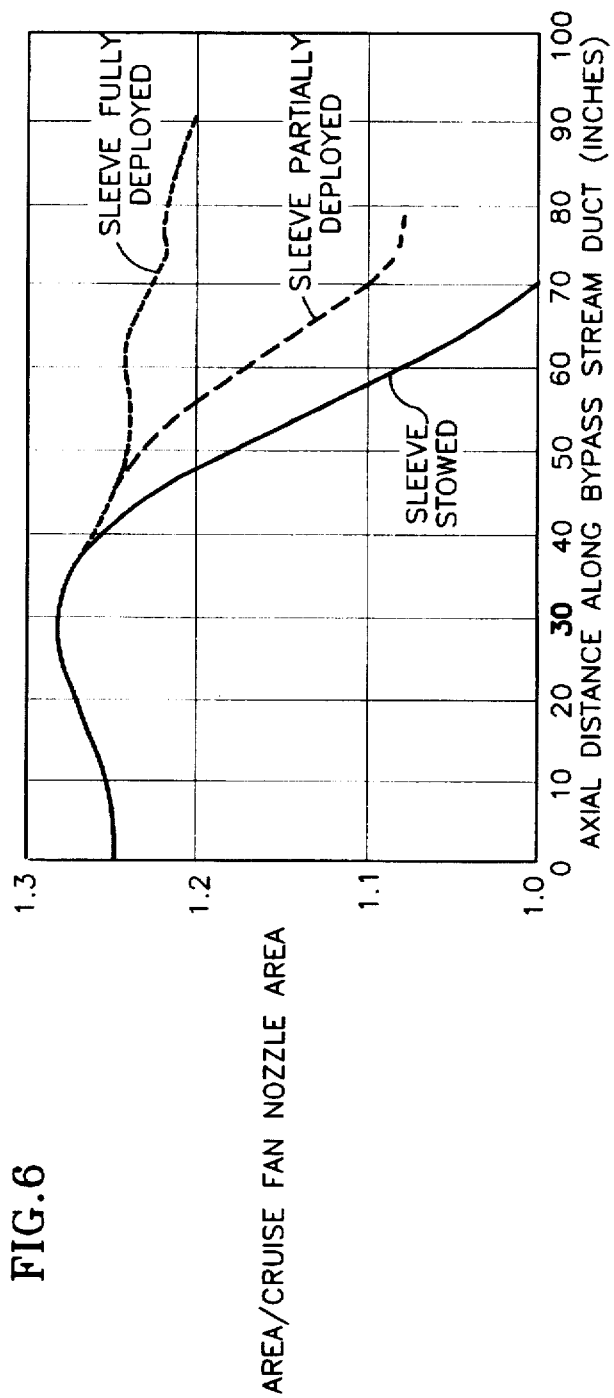
FIG. 6 is a graph illustrating the area of an exhaust duct defined by the sleeve and a core cowl with the sleeve in stowed, partially deployed and fully deployed positions.
Figure 7:
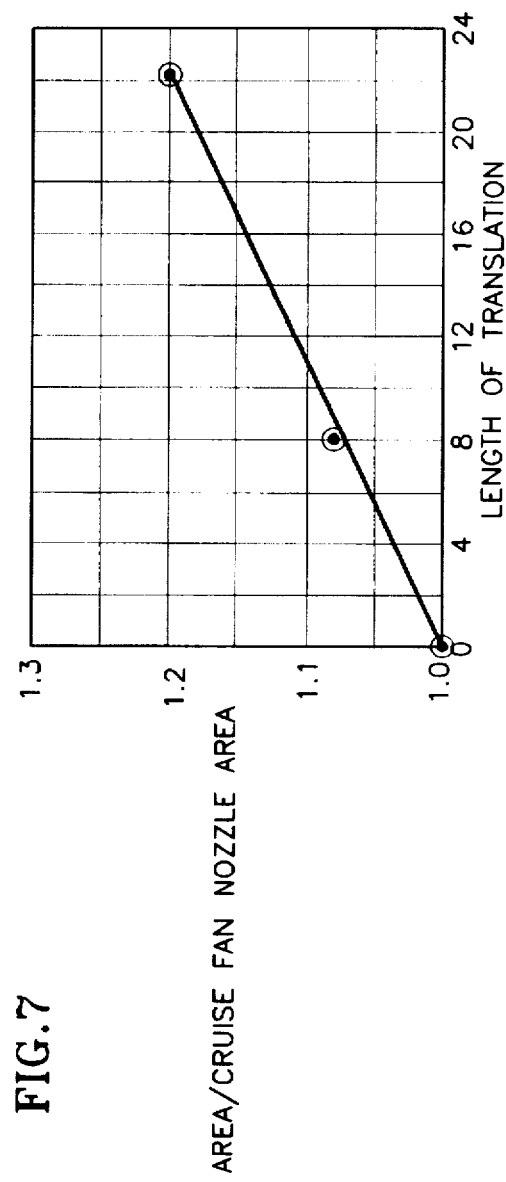
FIG. 7 is a graph illustrating the area of an exhaust nozzle throat as a function of the amount of sleeve translation.

The inner surface 74 of the translating sleeve 38 cooperates with the core cowl 26 to define a longitudinally extending annular exhaust duct 28 whose discharge plane is a throat 30 defined by the core cowl and the trailing edge 32 of the sleeve. The throat is the exclusive outlet for discharging a quantity of working medium gases from the duct for producing forward thrust. For all positions of the sleeve, the duct has an annular area which generally diminishes in the aft direction so that the area at the throat is the minimum area of the duct. This is seen most clearly in FIGS. 6 and 7. FIG. 6 shows the ratio of duct cross-sectional area to the minimum throat area (the throat area with the sleeve in its stowed position). The horizontal axis of FIG. 6 is a longitudinal distance, expressed in inches, along duct 28 where the value "30" corresponds to the longitudinal position at which the core cowl diameter is maximum. The area variation as a function of longitudinal distance is shown for stowed, partially deployed and fully deployed positions of sleeve 38. The rightmost terminus of each line represents the throat and demonstrates that the minimum duct area always occurs at the throat (i.e. at the exit plane of the duct 28). FIG. 7 shows the throat area as a function of the amount of sleeve translation and demonstrates that the area variation is approximately linear.

Additionally, the cross-sectional exit area of the throat is monotonically increasing as a function of aftward translation of the translating sleeve 38. Although any monotonically increasing behavior of the cross-sectional throat area of the nozzle is acceptable, for simplified control and greater accuracy in the positioning of the translating sleeve 38, it is most desirable to have a linear change in the cross-sectional area with respect to the position of the translating sleeve.

In cruise mode, shown in FIGS. 1 and 2, the moveable rods 68 of the thrust reverser actuators 58 are in their retracted positions so that the thrust reverser 36 is in its disengaged position. Working medium gases are therefore discharged from duct 28 exclusively through the throat 30 to produce forward thrust. The moveable rods 80 of the translating sleeve actuators 76 are also in their retracted positions so that the sleeve is in a fully stowed position where it is nested radially between the moveable body 52 and the blocker doors 50. As shown in FIG. 5, there are six thrust reverser actuators 58 and six translating sleeve actuators 76. The actuators and their respective actuating systems are mechanically independent of each other in that there is no mechanical interconnection between the actuating system of the reverser and the actuating system of the area modulating sleeve. Aftward translation of sleeve 38 by actuators 76 does not actively contribute to engagement of the reverser since continued operation of the sleeve actuation system, subsequent to deployment of the sleeve, will neither engage the reverser nor pre-position the reverser components in anticipation of subsequent reverser engagement. This independent arrangement is advantageous since malfunction of the sleeve actuation system cannot cause or actively contribute to uncommanded engagement of the thrust reverser. Uncommanded thrust reverser engagement can only result from a highly improbable dual malfunction of both the sleeve actuation system and the mechanically independent reverser actuation system. The sleeve does, however, passively contribute to engagement of the reverser since the sleeve, when in the stowed position of FIGS. 1 and 2, inhibits aftward movement of the moveable body 52 and accompanying aftward and pivotal movement of blocker doors 50. Thus, even if the reverser actuation system malfunctions and commands engagement of the reverser during cruise operation, the sleeve guards against such engagement.

At takeoff, climb, and descent, shown in FIG. 3, the translating sleeve 38 is fully deployed. The reverser remains at its disengaged position during and after translation of the sleeve and consequently the aerodynamically streamlined character of the outer nacelle is preserved. The hydraulic pressure activates the plurality of translating sleeve actuators 76 so that the moveable rods 80 extend axially downstream, thereby transmitting axial, downstream movement to the translating sleeve 38. The sliding downstream movement is effectuated as the T-sliders 96 disposed along the longitudinal edges 92–95 of the semi-cylinders 90, 91 of the translating sleeve 38 slidingly engage the tracks 97 of the hinge and latch mechanisms 98, 100. As the translating sleeve 38 is translated downstream, the annular area of the exhaust nozzle throat 30' defined by the trailing edge 32 of the translating sleeve 38 and the core cowl 26 is increased. The effective increase in the annular area of the fan nozzle is due to the decreasing downstream diameter of the conical core cowl 26. The greater area fan nozzle throat 30' becomes the controlling area for the exiting airflow 28 at takeoff, climb, and descent. The aerodynamically shaped inner surface 74 of the translating sleeve 38 insures that the airflow is not choked upstream of the fan exhaust nozzle 30'. A number of intermediate deployed positions between the fully stowed position and fully deployed position for the translating sleeve are possible with the hydraulic actuators being activated gradually.

After aircraft touch down, the thrust reverser 36 may be positioned at its engaged position to produce reverse thrust. For the thrust reverser 36 to be activated and effective, the translating sleeve 38 must first be translated aftwardly to expose the turning vanes 56 to the gases in the duct 28 and to enable aftward movement of the reverser. The translating sleeve 38 is activated and translates downstream in the same manner as described above. The thrust reverser 36 is moved axially downstream when the hydraulic pressure builds up in the thrust reverser cylinders 66 and extends the moveable rods 68 axially downstream. The thrust reverser 36 then slidingly moves downstream as the thrust reverser T-slides 96 slide downstream in the tracks 97. The reverser door 50 pivots radially inwardly to block the gases in duct 28 from exiting through the fan exhaust nozzle throat 30', thereby diverting the gases through the guide vanes 60.

The gas turbine engines that employ the present invention can achieve higher propulsive efficiency with a lower pressure ratio and high mass flow without sacrificing engine thrust and without fan stability problems. At cruise, as the translating sleeve is in the fully stowed position, the gas turbine engines with lower pressure ratios enjoy higher thrust, reduced noise levels and improved fuel consumption. At takeoff, climb, and approach, as the translating sleeve is in one of the deployed positions, the increased area of the fan exhaust nozzle 30' allows the additional air flow generated by the fan to exit the engine 10 without causing excessive back pressure on the fan blades and thus without stalling the fan 14. Moreover, gradually and continuously varying area of the fan exhaust nozzle allows further optimization of the performance by reducing the overall weight of the gas turbine engine and improving fuel consumption.

Furthermore, the combination of the lower fan pressure ratio and the higher fan mass flow reduces noise levels at approach, takeoff and climb. The noise reduction is a result of two factors. First, the fan rotating at lower speeds thereby producing less noise. Second, the extended downstream translating sleeve affords an additional attenuation path that reduces noise levels. Moreover, the combination of the lower fan pressure ratio and the higher fan mass flow improves fuel consumption at cruise.

The variable area fan exhaust nozzle having the translating sleeve 38 of the present invention allows an increase in the area of the nozzle throat in excess of 40%. The translating sleeve 38 achieves a significant increase in the area of the nozzle 30' without a significant weight penalty to the gas turbine engine 10. Furthermore, the two semi-cylinders 90, 91 of the translating sleeve 38 form a continuous inner surface 74 of the fan exhaust nozzle. The continuous surface 74 allows the nozzle to withstand the internal pressure of the airflow without excessive weight and to avoid air leakage.

The variable area fan nozzle of the present invention overcomes the major shortcomings of the prior art. The increase in throat area is achieved exclusively as a result of a downstream translation of the translating sleeve. Thus, the present invention avoids implementation of an auxiliary nozzle which introduces a radial velocity component to the nozzle efflux. When the engine is installed under the wing, this radial velocity component will adversely effect the basic wing lift generation at all speeds and degrade the effect of wing leading edge high lift devices at low speed operations.

The present invention also avoids the adverse effect of an auxiliary nozzle to the propulsion system and to the internal aerodynamic performance of the engine.

The invention is also less susceptible to uncommanded engagement of the reverser. The mechanical independence of the reverser and sleeve actuation systems guarantees that a malfunction of either system alone cannot cause uncommanded reverser engagement. Instead, such uncommanded engagement can only occur following a far less probable malfunction of both systems.

Finally, the invention ensures stable fan operation since the reverser is engageable with the area modulating sleeve in its aftmost, maximum throat area position. Unlike the apparatus disclosed in U.S. Pat. No. 4,922,713, the present invention does not require that engagement of the reverser be preceded by a potentially destabilizing reduction in the nozzle discharge area.

The present invention is also acoustically superior to the prior art in general, and to U.S. Pat. No. 4,922,713 in particular. All of the airflow exiting through the nozzle is acoustically treated and attenuated.

Although the invention has been shown and described with respect to exemplary embodiments thereof, it should be understood by those skilled in the art that various changes, omissions, and additions may be made thereto, without departing from the spirit and scope of the invention. For example, this invention can be used with a thrust reverser having translating turning vanes, rather than stationary turning vanes 56, as described in the preferred embodiment.

We claim:

1. A variable area exhaust nozzle for a gas turbine engine having a longitudinally extending axis, comprising:
   an aerodynamically streamlined outer nacelle having an upstream portion and a downstream portion, the downstream portion including:
      a thrust reverser having a moveable body and a plurality of blocker doors radially spaced apart from the moveable body, the thrust reverser being positionable at an engaged position and a disengaged position, and
      a fixed geometry translatable sleeve having a trailing edge aft of the moveable body, the sleeve being translatable between and deployable at a stowed position, a fully deployed position and a plurality of intermediate positions, the sleeve in its stowed position being nested radially intermediate the moveable body and the blocker doors so that the sleeve inhibits movement of the thrust reverser to its engaged position;
   a fixed geometry, aftwardly convergent core cowl radially spaced from the outer nacelle and cooperating therewith to define a longitudinally extending annular exhaust duct the exhaust duct having a throat defined by the core cowl and the trailing edge of the sleeve, the throat being the exclusive outlet for discharging a quantity of working medium gases from the duct for producing forward thrust, the duct having, for all positions of the sleeve, an aftwardly generally diminishing annular area including a throat area, the throat area being the minimum area of the duct;
   a sleeve actuation system including a plurality of sleeve actuators for effecting translatory movement of the sleeve, the translatory movement being the exclusive means for varying the throat area and the quantity of forward thrust producing gases discharged from the duct, aftward movement of the sleeve causing an increase in the throat area and forward movement of the sleeve causing a decrease in the throat area;

a thrust reverser actuation system including a plurality of thrust reverser actuators for positioning the thrust reverser at the disengaged position whereby working medium gases are discharged from the duct exclusively through the throat to produce forward thrust, and at the engaged position whereby at least a portion of the working medium gases are diverted to produce reverse thrust; and the thrust reverser actuation system being mechanically independent of the sleeve actuation system so that translation of the sleeve does not actively contribute to engagement of the reverser.

2. The exhaust nozzle of claim 1 wherein the throat area undergoes a monotonic increase with aftward translation of the sleeve.

3. The exhaust nozzle of claim 2 wherein the monotonic increase is linear.

4. The exhaust nozzle of claim 1 wherein the aerodynamically streamlined character of the nacelle is preserved at all positions of the sleeve with the thrust reverser in its disengaged position.

5. The exhaust nozzle of claim 1 wherein the thrust reverser is engageable with the sleeve in its aftmost, maximum throat area position.

6. The exhaust nozzle of claim 1 wherein the translating sleeve is a pair of semi-cylinders mating with each other to form a substantially continuous inner surface of the duct.

7. The exhaust nozzle of claim 1 wherein the increase and decrease in throat area arising from aftward movement of the sleeve are nondiscontinuous.

\* \* \* \* \*